(12) United States Patent
Foes

(10) Patent No.: US 7,400,417 B2  
(45) Date of Patent: Jul. 15, 2008

(54) DIFFRACTION METHOD FOR MEASURING THICKNESS OF A WORKPART

(75) Inventor: Scott Foes, Ann Arbor, MI (US)

(73) Assignee: Federal Mogul World Wide, Inc., Southfield, MI (US)

(*) Notice: Subject to any disclaimer, the term of this patent is extended or adjusted under 35 U.S.C. 154(b) by 416 days.

(21) Appl. No.: 11/135,469

(22) Filed: May 23, 2005

(65) Prior Publication Data

US 2006/0262327 A1 Nov. 23, 2006

(51) Int. Cl.
G01B 11/28 (2006.01)

(52) U.S. Cl. .............................. 356/630; 356/626
(58) Field of Classification Search .......... 356/630–635
See application file for complete search history.

(56) References Cited

U.S. PATENT DOCUMENTS

| | | | |
|---|---|---|---|
| 3,643,101 A * | 2/1972 | Shipp et al. ............... 250/216 |
| 3,720,471 A * | 3/1973 | Kasahara et al. ............. 356/504 |
| 3,937,580 A * | 2/1976 | Kasdan ..................... 356/635 |
| 3,957,376 A * | 5/1976 | Charsky et al. ............. 356/496 |
| 4,247,203 A | 1/1981 | Levy et al. |
| 4,687,328 A | 8/1987 | Shiraishi et al. ............. 356/384 |
| 4,745,295 A | 5/1988 | Seno et al. ................. 250/560 |
| 5,103,104 A * | 4/1992 | Tissier et al. ........... 250/559.24 |
| 5,264,909 A | 11/1993 | Rochester ................. 356/73.1 |
| 5,570,188 A | 10/1996 | Nevel et al. ............... 356/385 |
| 5,615,012 A | 3/1997 | Kazem-Goudarzi et al. . 356/384 |
| 5,615,014 A | 3/1997 | Okuda ....................... 356/429 |
| 5,700,671 A | 12/1997 | Prieto et al. ............. 435/172.3 |
| 5,754,294 A | 5/1998 | Jones et al. ................. 356/355 |
| 6,333,500 B2 | 12/2001 | Gehring et al. ........... 250/341.1 |
| 6,346,988 B1 | 2/2002 | Bartunek et al. ............ 356/635 |
| 6,589,603 B1 | 7/2003 | Cornell et al. |
| 6,687,015 B1 | 2/2004 | Waller et al. |
| 6,791,784 B2 * | 9/2004 | Edwards .................. 360/77.03 |
| 7,038,207 B2 * | 5/2006 | Hwang .................. 250/339.07 |
| 2001/0019407 A1 | 9/2001 | Sato et al. |
| 2002/0039184 A1 | 4/2002 | Sandusky .................... 356/369 |
| 2002/0089677 A1 | 7/2002 | Ziegler et al. ............... 356/630 |
| 2004/0009413 A1 | 1/2004 | Lizotte |

* cited by examiner

*Primary Examiner*—L. G. Lauchman
*Assistant Examiner*—Jarreas C Underwood
(74) *Attorney, Agent, or Firm*—Robert L. Stearns; Dickinson Wright PLLC

(57) ABSTRACT

The thickness of a workpart (10) is measured to a high degree of accuracy by passing a coherent light beam (20) through an aperture (16) in the workpart (10). The aperture (16') can alternatively be created between an edge of the workpart (10) and an external reference plate (30). The light is diffracted on the far side of the workpart (10) and its diffraction pattern captured by a CCD camera (22). The captured image is analyzed by a computer (24) which compares the captured diffraction pattern to a stored referenced value to determine whether the thickness of the workpart (10) is within an acceptable range. The method is capable of returning measurements with micron or submicron resolution, and is a robust process readily adaptable to high volume production quality control applications.

27 Claims, 4 Drawing Sheets

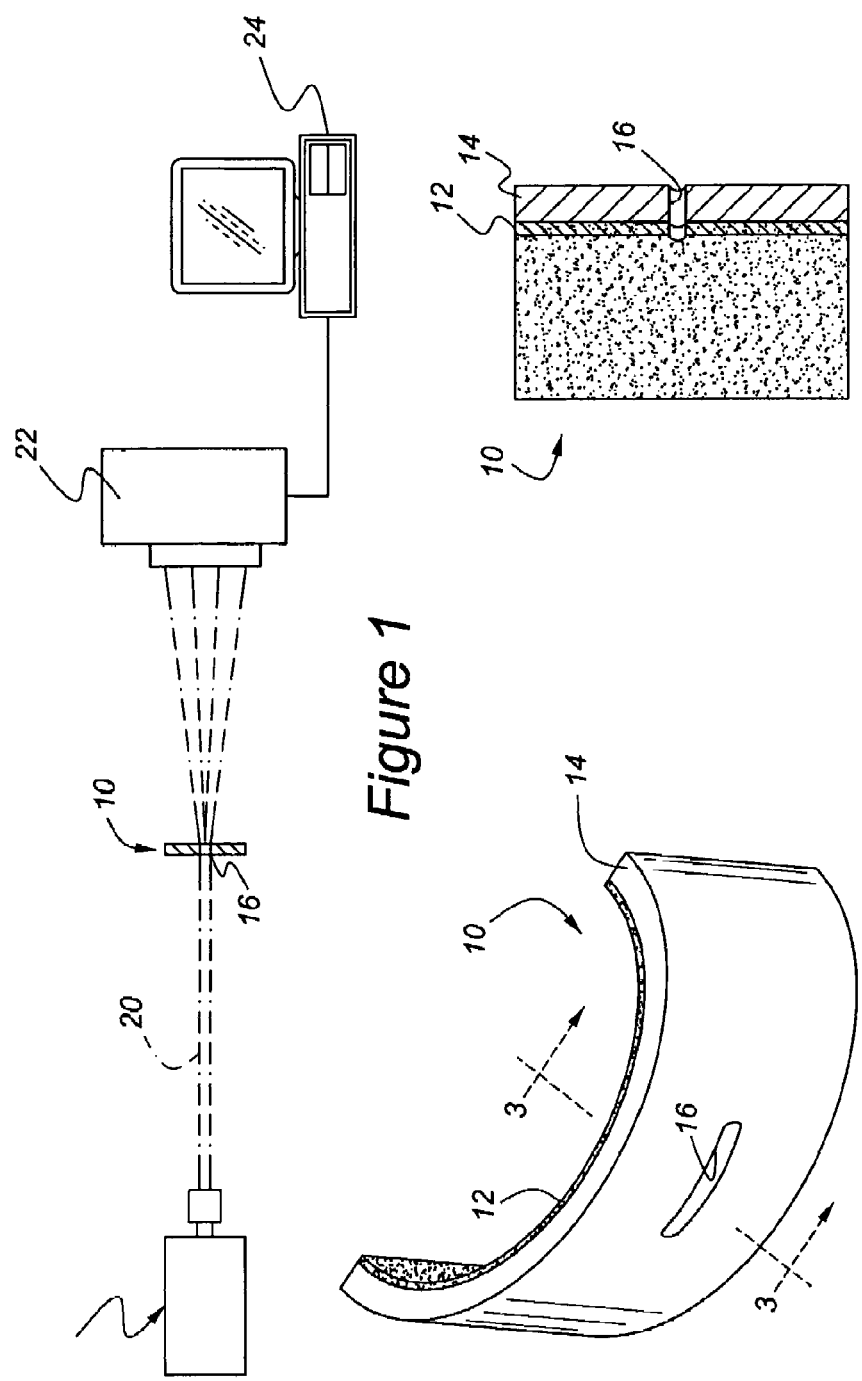

DIFFRACTION METHOD FOR MEASURING THICKNESS OF A WORKPART

BACKGROUND OF THE INVENTION

1. Field of the Invention

The invention relates to a method for measuring the thickness of objects by diffracting a coherent beam of light through an aperture or across an edge and comparing the diffraction pattern to a reference diffraction pattern.

2. Related Art

In the manufacturing environment, there is often a need to measure the thickness of manufactured components or workparts with a high degree of accuracy. In some applications, thickness measurements with micron or submicron resolution are necessary.

In situations requiring high resolution thickness measurements, it has been proposed to use the technique of laser triangulation, in which measurements are calculated based on the reflection of multiple laser beams off the surface. One problem with optical measurement methods results from the so-called "noise" created by unwanted light reflections. Such noise can produce false positive and/or false negative measurements. In high-volume mass production manufacturing operations, quality control standards often require defective parts statistics less than one or two parts per million. When the difference between an acceptable and unacceptable workpart is a thickness measurement in the range of a few microns, achieving and maintaining consistent production quality can be a challenge.

Accordingly, there is a need for a thickness measuring technique which is highly accurate, robust, not sensitive to light noise created from unwanted reflections, and adaptable to high production volume settings.

SUMMARY OF THE INVENTION AND ADVANTAGES

The invention comprises a method for measuring the thickness of a workpart comprising the steps of: forming an aperture through a workpart, passing a light beam through the aperture to create a light diffraction pattern on the far side of the workpart, capturing the diffraction pattern, and measuring the captured diffraction pattern to determine the thickness of the workpart. The measure of the diffraction pattern is indicative of the workpart thickness so that acceptable diffraction pattern measurements can be associated with workpart thicknesses in an acceptable range.

According to another aspect of the invention, a method for measuring the thickness of a workpart comprises the steps of: providing a test piece of known thickness, forming an aperture through the test piece, passing a light beam through the aperture to create a light diffraction pattern on the far side of the test piece, capturing the diffraction pattern, measuring the captured diffraction pattern to establish a reference diffraction pattern, and associating the reference diffraction pattern with the known thickness of the test piece. An aperture is then formed through a workpart of unknown thickness and a light beam passed through the aperture of the workpart to create a light diffraction pattern on the far side of the workpart. The diffraction pattern is captured and then compared to the referenced diffraction pattern to determine whether the thickness of the workpart is equal to the known thickness of the test piece.

According to yet another aspect of the invention, a method of inspecting the thickness of a plurality of workparts traveling in a predetermined path comprises the steps of: conveying a plurality of workparts along a predetermined path, wherein the workparts are of unknown thickness and each have an aperture of identical dimensions formed therethrough. The method continues with the step of directing a light beam at the workparts in sequence so that the light beam passes through the aperture of each workpart in succession to project a distinctive light diffraction pattern for each workpart on the far side of the workpart. The diffraction pattern is captured and then measured to determine the thickness of the workpart.

This invention, which operates on the principle of analyzing light that is passed through an aperture, rather than reflected off a surface, provides higher signal-to-noise ratios thus making the thickness measurements more robust.

BRIEF DESCRIPTION OF THE DRAWINGS

These and other features and advantages of the present invention will become more readily appreciated as the same becomes better understood by reference to the following detailed description when considered in connection with the accompanying drawings, wherein:

FIG. 1 is a schematic view demonstrating how a coherent beam of light is passed through an aperture in a workpart and captured on a CCD camera and finally processed by a computer;

FIG. 2 is a perspective view of an exemplary workpart fitted with an aperture through which a coherent beam of light may be passed;

FIG. 3 is a cross-sectional view of the workpart taken along lines 3-3 of FIG. 2;

DETAILED DESCRIPTION OF THE PREFERRED EMBODIMENT

Figures 4A, 4B, 4C:
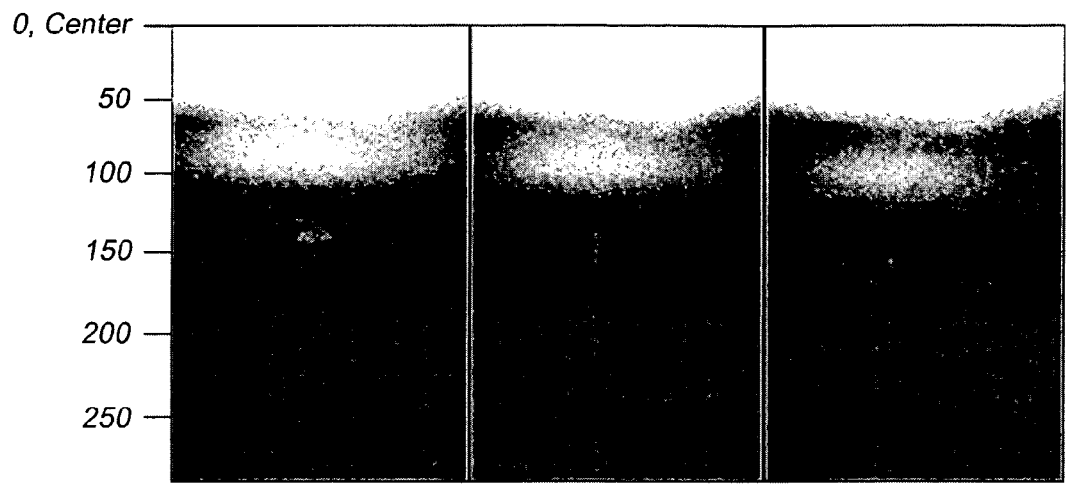
FIGS. 4A through 4C represent a sector of exemplary diffraction patterns captured by the CCD camera, with FIG. 4B representing a ten micron change in thickness from FIG. 4A and FIG. 4C representing a ten micron change from FIG. 4B.

Referring to the Figures, wherein like numerals indicate like or corresponding parts throughout several views, a workpart according to the subject invention is generally shown at 10. The workpart 10 may comprise any article of manufacture, however, is preferably of the type having a generally planer and consistent cross-sectional thickness in the region to be measured. Also, the workpart 10 is of the type whose dimensional thickness must be measured to exacting tolerances. The method of this invention is well suited to measuring workpart thicknesses on the order of a few microns or even less.

For the purposes of example only, and not to be in any way limiting, the workpart 10 may comprise an engine bearing of the type positioned between the crankshaft and either the main bearings or the connecting rods. An engine bearing is a good example of a workpart for this invention, because such engine bearings must be manufactured to exacting tolerances. Furthermore, engine bearings, like many workparts, are manufactured as a composite comprising a top material layer 12 and an underlying substrate 14. Quite often, during the workpart manufacturing process, the techniques used to apply the top layer 12 require exacting controls. Any one of a number of parameter changes can result in the top layer 12 being deposited or applied too thickly or too thinly. In the example of powder coating, the top layer 12 can achieve an unacceptable deposition thickness if the spray equipment or other handling or post treating steps are not followed precisely. This can result in a finished workpart 10 which has a thickness out of tolerance.

Depending on the particular type of workpart 10 being measured, there is typically an opportunity to form an aperture 16 through the workpart 10 at some location in which a thickness measurement is desired. In one preferred embodiment of this invention, the aperture 16 must be formed fully through the thickness the workpart 10 to be measured. Thus, if the workpart 10 is composed of multiple layers, such as a top layer 12 and a substrate 14, the aperture 16 must form a complete pass-through, fully open from one surface to the other. The aperture 16 may be of any appropriate shape, including circular or otherwise, but is shown in the figures taking the form of an elongated slit which has traditional acceptance in the field of diffraction optics. Furthermore, it is not necessary that the aperture 16 be fully bounded on all sides by remaining portions of the workpart 10. Instead, the aperture 16 can take the form of a notch or cut propagating inwardly from an edge of the workpart 10. In some applications, the aperture 16 may even take the form of a protruding obstacle. This is because the purpose of the aperture 16 is to interact with light waves to create a diffraction effect. And, it is well known that diffraction effects can occur when incident light waves interact with either obstacles or apertures of finite size. When the light waves bend around the obstacles or spread out from the aperture 16, waves propagate outwardly resulting in a diffraction pattern which can be analyzed.

Referring to FIG. 1, a device for creating a beam of light is generally indicated at 18. Preferably, this device consists of a laser or other device capable of producing coherent light, i.e., radiant electromagnetic energy of the same or nearly the same wavelength and with definite phase relationships between different points in the field. When the laser 18 is energized, it emits a light beam 20 which is directed at the aperture 16 in the workpart 10. When the light waves interact with the aperture 16, the light waves spread out from the aperture in the familiar manner of water waves, creating a diffraction effect on the far side of the workpart 10. This diffraction effect is represented by the spreading of the light beam 20 in FIG. 1.

A device, such as a CCD camera 22, is positioned in the path of the diffracted light beam 20 to capture the diffraction pattern. In the case of CCD cameras, this diffraction pattern is captured on a piece of silicon called a charge-coupled device, i.e., CCD. This silicon wafer is a solid-state electronic component which is usually micro-manufactured and segmented into an array of individual light-sensitive cells. The CCD camera 22 thus collects the diffraction signature produced by the laser light 20 passing through the aperture 16, with each light sensitive cell registering a given intensity of light at a given spatial position. These relationships, i.e., intensity as a function of position, can be readily plotted and graphed. A device may be operatively coupled to the CCD camera 22 for receiving, processing, and presenting the intensity vs. position data from the captured diffraction pattern. This device may preferably be a computer which is then programmed to determine the thickness of the workpart 10 by measuring the intensity and position values. Because the diffraction pattern is indicative of the workpart 10 thickness, changes in the measured diffraction pattern are useful to conclude whether the thickness of the workpart 10 may be out of tolerance.

Instead of measuring the diffraction pattern per se, the computer 24 can determine workpart 10 thickness by comparing the captured diffraction pattern to one or more reference patterns contained in recorded memory. For example, FIGS. 4A through 4C represent the diffraction patterns for three different workparts 10, each containing an aperture 16 of identical dimensions. However, the thickness of the workpart 10, in FIG. 4A is ten microns smaller than the thickness of workpart 10 in FIG. 4B. And again, the workpart 10 associated with FIG. 4B is ten microns thinner than the workpart 10 associated with the diffraction pattern of FIG. 4C.

Figure 5:
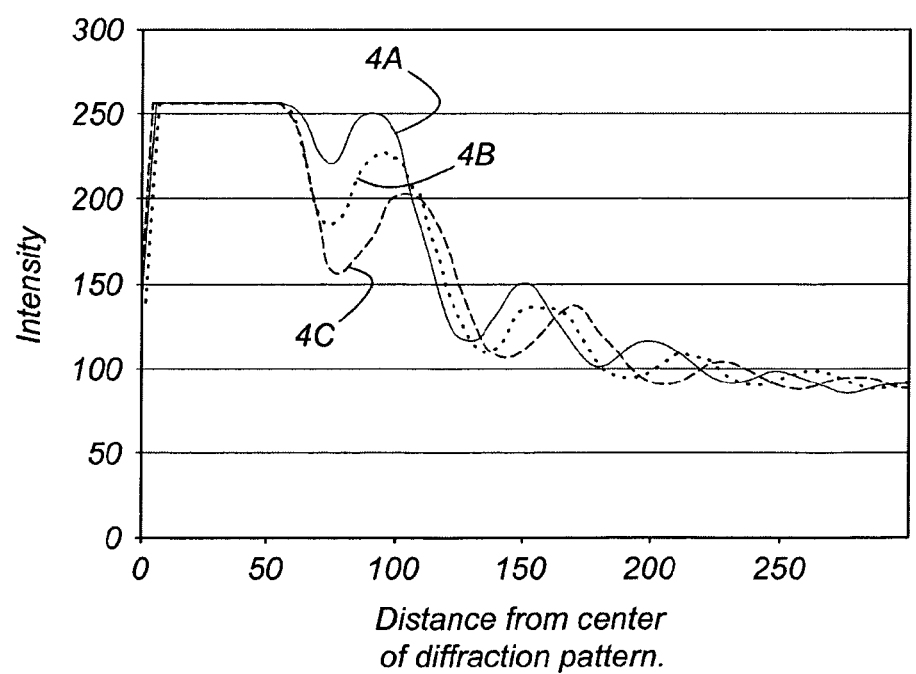
FIG. 5 is a graph comparing the intensity values for each of the images presented in FIGS. 4A through 4C as a function of distance from the center of the diffraction pattern.

By comparing the diffraction patterns in FIGS. 4A, 4B, and 4C, it is evident that the thickness of the workpart 10 responsible for producing the diffraction pattern of FIG. 4A is ten microns thinner than the workpart 10 that produced the diffraction pattern of FIG. 4B, and 20 microns thinner than the workpart 10 which produced the diffraction pattern in FIG. 4C. Additional useful information can be gleaned by comparing the intensity values of the images corresponding to FIGS. 4A, 4B, and 4C in graph form. A graph showing these intensity value comparisons as a function of distance is provided in FIG. 5.

Using either a comparison technique or a measurement technique, the computer 24 analyzes the captured diffraction pattern produced by the workpart 10 to determine whether the thickness of the workpart 10 is within or outside of an acceptable range. Of course, the breadth of an acceptable range is determined by the intended application of the workpart 10.

According to this comparison technique for determining workpart 10 thicknesses, a test piece is provided having a known thickness. The test piece is preferably identical in all respects to a workpart 10. An aperture is formed through the workpiece which is dimensionally identical to the aperture 16 in the workpiece 10. A light beam 20 from the laser 18 is passed through the aperture in the test piece to create a light diffraction pattern on the far side of the test piece. This diffraction pattern is captured by the CCD camera 22 and then measured and/or stored in the computer memory. This capture diffraction pattern (and/or measurement characteristics) are associated with the known thickness of the test piece. Thus, when an actual workpart 10 is measured using this diffraction pattern capturing technique, the captured diffraction pattern from the workpart 10 is compared to the referenced diffraction pattern created by the test piece and a determination made by the computer 24 as to whether the thickness of the workpart 10 is equal to that of the test piece.

Figure 6:
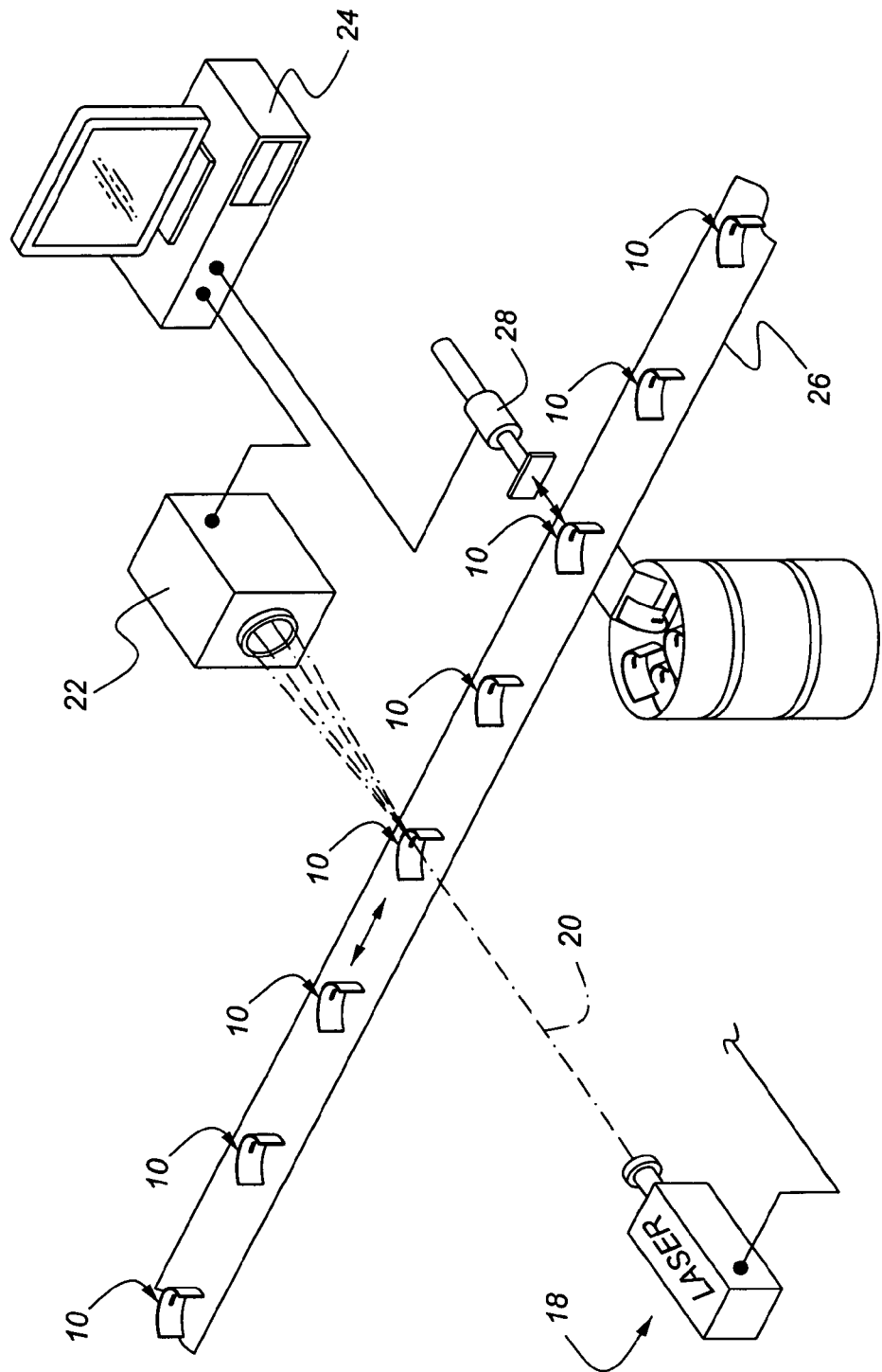
FIG. 6 is a simplified view showing a method for inspecting the thickness of sequentially manufactured workparts in a high volume production setting.

Referring now to FIG. 6, a method for inspecting the thickness of a plurality of workparts 10 traveling along a predetermined path is shown. The predetermined path preferably comprises a material handling device 26, which in the example of FIG. 6 is a simple conveyor belt. Alternatively, the material handling device 26 can be a carrousel or any other type unit which moves the workparts 10 in a predictable path. In this scenario, the material handling device 26 may usher workparts 10 directly from a manufacturing operation so that their thicknesses can be determined for quality control purposes. The laser 18 is positioned adjacent the material handling device 26 so that its light beam 20 is directed at the passing array of workparts 10. The light beam 20 is focused to pass through the aperture 16 in every workpart 10 passing by, such that the orientation of the workparts 10 is important. Alternatively, if a statistical sampling of thicknesses is sufficient, only a given number of workparts 10 per thousand need be provided with an aperture 16 and measured according to this method.

The CCD camera 22 is placed on the opposite side of the material handling device 26, ready to receive the diffraction pattern emerging from the far side of the workparts 10 as they cross the light beam 20. The computer 24 quickly analyzes the distinctive diffraction pattern for each workpart 10 and makes a measurement determination as to whether the thickness of the workpart 10 is within an acceptable range. If not within an acceptable range, the computer 24 may be coupled with a reject device 28 which diverts a workpart 10 away from the predetermined path of the material handling device 26.

While the example of FIG. 6 suggests that the laser 18 and light beam 20 remain stationary while the workparts 10 are conveyed therepast, other arrangements and configurations are possible. For example, the laser 18 and CCD camera 22 can move with the workparts 10 as they travel their predetermined path, or the laser 18 and CCD camera 22 can move a predetermined path while the workparts 10 remain stationary.

Figure 7:
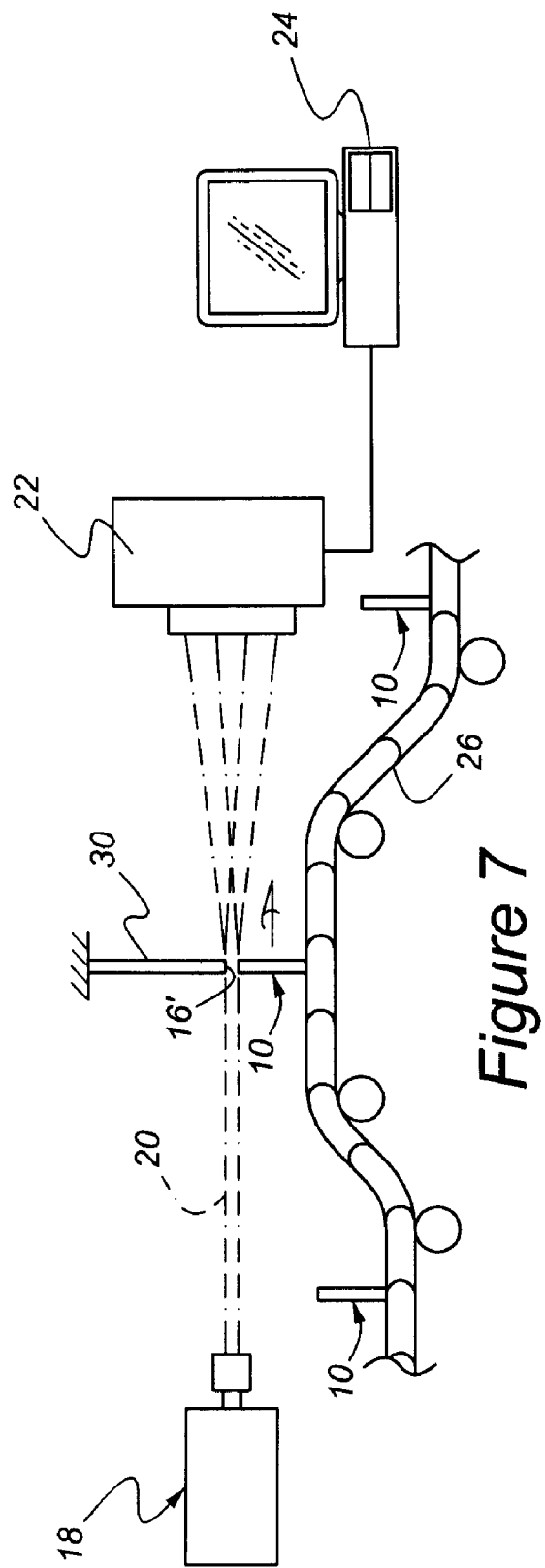
FIG. 7 is a schematic view of an alternative embodiment of the invention.

Those skilled in the art will appreciate other configurations as well. For example, in FIG. 7 another preferred embodiment of the invention is shown in which the aperture 16' is formed between an outer edge of the workpart 10 and a reference plate 30. The reference plate 30 is, in this example, held stationary while the workparts 10 are conveyed along a material handling device 26'. However the reverse motions are equally possible, as well as the possibility for both workpart 10 and reference plate 30 to be in motion or stationary at the same time. In any event, the light beam 20 is directed at the aperture 16' and a diffraction pattern is thereby created on the opposite side. Using any known technique, the captured diffraction pattern can be analyzed to determine whether the thickness of the workpart 10 is within or outside of an acceptable range. This alternative embodiment has the advantage of obviating the need to form a hole or notch in the workpart 10 in situations when such is not convenient.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A method for measuring the thickness of a workpart, said method comprising the steps of:
   forming an aperture having at least one side thereof established by the workpart;
   passing a light beam through the aperture to create a light diffraction pattern on the far side of the workpart;
   capturing the diffraction pattern; and
   measuring the captured diffraction pattern to determine the thickness of the workpart, wherein the measure of the diffraction pattern is indicative of the workpart thickness.

2. The method as set forth in claim 1 further including the step of forming the workpart as a composite construction comprising a top material layer residing on a substrate.

3. The method as set forth in claim 2 including forming the top layer as a coating on the substrate.

4. The method as set forth in claim 2 wherein the top layer is formed in a powder coating operation.

5. The method as set forth in claim 2 wherein said step of forming an aperture includes simultaneously forming a opening through the substrate and the top material layer.

6. The method as set forth in claim 1 wherein said step of passing a light beam includes generating coherent light.

7. The method as set forth in claim 6 wherein said step of generating coherent light includes energizing a laser device.

8. The method as set forth in claim 1 wherein said step of forming an aperture includes forming a non-circular hole.

9. The method as set forth in claim 1 wherein said measuring step includes analyzing the diffraction pattern with a device that receives, processes and presents data.

10. The method as set forth in claim 1 wherein said step of capturing the diffraction pattern includes positioning a CCD camera in the path of light passing through the aperture.

11. The method as set forth in claim 1 wherein said step of forming an aperture includes bounding all sides of the aperture with solid material.

12. The method as set forth in claim 1 wherein said step of forming an aperture includes positioning a reference plate adjacent edge of the workpart.

13. A method for measuring the thickness of a workpart, said method comprising the steps of:
   providing a test piece of known thickness;
   forming an aperture having at least one side thereof established by the test piece;
   passing a light beam through the aperture to create a light diffraction pattern on the far side of the test piece;
   capturing the diffraction pattern;
   storing the captured diffraction pattern as a reference diffraction pattern; associating the referenced diffraction pattern with the known thickness of the test piece;
   forming an aperture having at least one side thereof established by the workpart of unknown thickness;
   passing a light beam through the aperture of the workpart to create a light diffraction pattern on the far side of the workpart;
   capturing the diffraction pattern; and
   comparing the captured diffraction pattern from the workpart to the referenced diffraction pattern to determine whether the thickness of the workpart is equal to the known thickness of the test piece.

14. The method as set forth in claim 13 further including the step of forming the workpart as a composite comprising a top material layer residing over a substrate.

15. The method as set forth in claim 14 wherein said step of forming an aperture in the workpart includes simultaneously forming an opening through the substrate and the top material layer.

16. The method as set forth in claim 13 wherein said step of passing a light beam includes generating coherent light.

17. The method as set forth in claim 13 wherein said step of forming an aperture in the workpart includes forming a non-circular opening.

18. The method as set forth in claim 13 wherein said step of capturing the diffraction pattern includes positioning a CCD camera in the path of light passing through the aperture.

19. The method as set forth in claim 13 wherein said step of forming an aperture in the workpart includes positioning a reference plate adjacent edge of the workpart.

20. A method of inspecting the thickness of a plurality of workparts traveling in a predetermined path, comprising the steps of:
   conveying a plurality of workparts along a predetermined path, wherein the workparts are of unknown thickness;
   directing a light beam at the workparts so that the light beam passes through an aperture having at least one side thereof established by each workpart to project a distinctive light diffraction pattern for each workpart on the far side of the workpart;
   capturing the diffraction pattern; and
   measuring the captured diffraction pattern to determine the thickness of the workpart, wherein the diffraction pattern is indicative of the workpart thickness.

21. The method as set forth in claim 20 wherein said measuring step includes comparing the captured diffraction pattern from each workpart to a referenced diffraction pattern associated with a known workpart thickness.

22. The method as set forth in claim 20 further including the step of forming the workpart as a composite having a top material layer applied to a substrate.

23. The method as set forth in claim 20 wherein said step of directing a light beam includes generating coherent light.

24. The method as set forth in claim 20 wherein said step of directing a light beam includes maintaining the beam of light in a consistent path while the workparts are conveyed there past.

25. The method as set forth in claim 20 wherein said step of capturing the diffraction pattern includes positioning a CCD camera in the path of light passing through the respective apertures.

26. The method as set forth in claim 20 further including the step of diverting a workpart away from the predetermined path if its measured thickness deviates from an acceptable range.

27. The method as set forth in claim 20 further including the step of conveying includes moving the workparts past a reference plate such that an aperture is formed between the reference plate and each passing workpart.

* * * * *